July 24, 1962

F. W. KULICKE, JR 3,046,006

MICROPOSITIONER

Filed April 12, 1960

INVENTOR.
FREDERICK W. KULICKE, JR.
BY
Bilker & Moyerman
ATTORNEYS.

United States Patent Office 3,046,006
Patented July 24, 1962

1

3,046,006
MICROPOSITIONER
Frederick W. Kulicke, Jr., Philadelphia, Pa., assignor to Kulicke & Soffa Mfg. Co., Philadelphia, Pa., a corporation of Pennsylvania
Filed Apr. 12, 1960, Ser. No. 21,706
12 Claims. (Cl. 269—60)

This invention relates to a micro-positioner or micro-manipulator and, more particularly, relates to a work table type device for controlling the sub-miniature positioning of a part or tool in three planes.

Modern day manufacturing and assembly procedures often require that a particular part and/or tool be positioned and delicately oriented with respect to another part or tool in order to perform incident operations with a high degree of precision. Such precision operations usually necessitate the minuscule movement of the part or tool trihedrally along the X-, Y- and Z-axes wherein the distance through which displacement or manipulation occurs is ascertainable only by microscopic observation or micrometer measurements. It is of especial importance in the fabrication of semi-conductors, transistors and electronic tubes, during experimental, laboratory, as well as production handling, that a component be manipulated rapidly and consistently into proper configuration without impediment of positioner backlash or play and without the manipulative device being subject appreciably to the effects of temperature changes as to require continual adjustment.

Prior high precision positioners required such extremely close tolerances in the fitting of their components and assemblies as to make the costs thereof prohibitive. Furthermore, former designs, in utilizing fine tolerances, close fittings and screw pressure pre-loading, made these manipulators particularly vulnerable to irreparable permanent damage as a result of accidental shock or extremes of temperature, and, at the very least, constant readjustment and re-alignment.

It is therefore an object of this invention to provide a micro-positioner capable of smooth, rapid and accurate manipulation along X-, Y- and Z-axes.

Another object of this invention is to provide a multi-stage micro-positioner for precisely controlling the movement into position of a part or tool during manufacturing or assembly operations.

Another object of this invention is to provide a sub-miniature positioning device which during manipulation will insure a steady measured movement with minimum friction and without backlash or play.

Another object of this invention is to construct a high precision micro-positioner which will automatically compensate for changes in temperature without requiring any manual internal adjustment.

Another object of this invention is to construct a high precision micro-positioner at minimal cost wherein possible damage caused by accidental shock or overloaded conditions is substantially eliminated.

Another object of this invention is to construct a high precision micro-positioner whose components will naturally fall into accurate registration without the necessity of overburdensome tolerances required in their fabrication.

Other objects of this invention are to provide an improved device of the character described which is sturdy in construction, economical to produce and which is highly efficient in operation.

2

With the above and related objects in view, this invention consists of the details of construction and combination of parts as will be more fully understood from the following description when read in conjunction with the accompanying drawings, in which.

Figure 1:
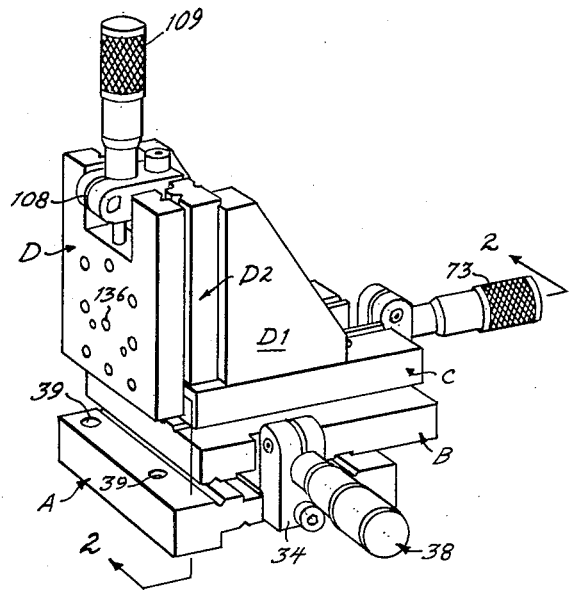
FIG. 1 is a perspective view of a micro-positioning manipulator embodying this invention.

Referring now in greater detail to the drawings in which similar reference characters refer to similar parts, there is illustrated a micro-positioning manipulator comprising a base, generally designated as A, an X-axis slider or first stage, generally designated as B, axially reciprocable in a horizontal plane upon the base, and a second stage or Y-axis slider, generally designated as C, horizontally reciprocable on the first stage along an axis transverse to the reciprocation thereof whereby a point on the second stage is adapted to be oriented within a horizontal plane by manipulating the first and second stages along their respective X- and Y-axes.

Figure 3:
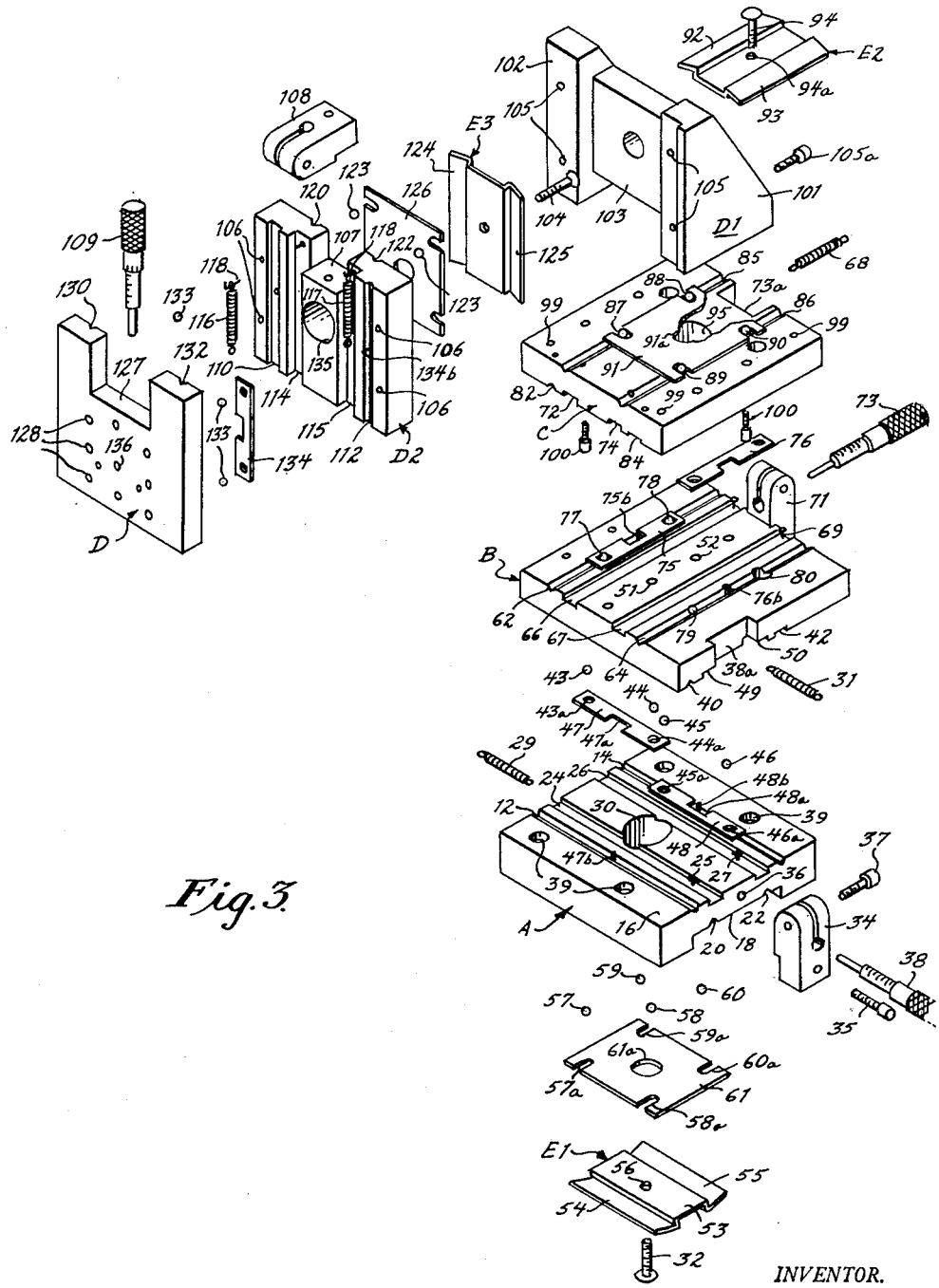
FIG. 3 is an exploded perspective view of the micro-positioning manipulator.

As shown in FIGS. 1 and 3, a third stage or Z-axis slider, generally designated as D, is coupled to the second stage C by a mounting bracket D1 through a third stage support member D2 and is reciprocably slidable on a vertical axis so that a point on the third stage may be oriented tri-axially by selective manipulation of the first, second and third stages. Spring clamping means E1, E2 and E3 resiliently couple respectively the first stage B to the base A, the second stage C to the first stage B, and the third stage D to the support member D2, each clamp being tensioned in a plane perpendicular to the plane of the corresponding stage and slidable axially therewith.

The base A comprises a substantially rectangular metal plate having a pair of grooved V-shaped races 12 and 14 which extend rectilinearly along the upper surface 16 thereof in spaced parallel relationship. The under surface of the base A is longitudinally recessed at 18 to accommodate the spring clamp E1, and a pair of spaced V-shaped races 20 and 22 are grooved in the roof of the recess 18 parallel to the races 12 and 14. Parallel notches 24 and 26 are formed in the upper surface 16 inboard of the races 12 and 14 to hold therein coil springs 29 and 31 which resiliently direct the first stage B in a preferential direction. Spring hanger pins 25 and 27 project vertically upwardly from the notches 24 and 26 so that the pin heads extends immediately above the level of the surface 16 adjacent the right hand edge of the base A as shown in FIG. 3. The heads of the pins 25 and 27 retain the coil springs 29 and 31 in tension, the opposite ends of the springs being looped about hanger pins (not shown) downwardly depending from the under surface of the first stage B adjacent the left hand edge thereof. A relatively large diameter bore 30 vertically extends through the base A, the side wall of the bore circumferentially surrounding a stud 32 of the spring clamp E1 and acting as a position limiter for the axial movement of the first stage B as will be more fully described hereinafter.

A split clamp 34 is affixed to the right hand edge of the base A by a screw 35 threaded into tapped hole 36. The split clamp 34 is tightened about the barrel of a micrometer 38 by a screw 37 so that the spindle of the micrometer is free to move axially when the conventional knurled handle is rotated by the operator's fingers in the usual manner. A plurality of counterbored mounting holes 39 are rectangularly positioned about the base A for conveniently fixing the micro-positioner to a work surface.

The first stage B or X-axis slider is also substantially rectangular in configuration, the lower surface of this metal plate having a V-shaped race 40 and a race 42, rectangular in cross section, rectilinearly extending therein in spaced parallel relationship. When race 40 is set into complementary registration with race 12 of the base A, the race 42 will correspondingly register with the race 14. It is to be observed that the rectangular configuration of the race 42 requires a coarser center to center machining tolerance than would pairs of complementary raceways V-shaped in configuration since the latter would require maximum precision in machining for accommodating ball bearing pairs 43, 44 and 45, 46 in smooth registration.

Ball separators 47 and 48 maintain each of the ball pairs 43, 44 and 45, 46 in spaced relationship, separator 47 having spaced holes 43a and 44a of a larger diameter than the balls and freely passing peripherally thereabout, and spacer 8 having holes 45a and 46a to correspondingly embrace the balls 45 and 46. Notches 47a and 48a in the respective spacers respectively engage on pins 47b and 48b upwardly extending from the races 12 and 14 to effectively limit the longitudinal movement of the separators with respect to these races.

Longitudinally extending slots 49 and 50 intermediate the races 40 and 42 in the first stage B register with the slots 24 and 26 in the base A and define a channel therebetween for retaining the springs 29 and 31 in non-interferent position. Tapped holes 51 and 52 in the first stage B are utilized for assembling the spring clamps E1 and E2 to that stage.

The spring clamp E1 is a flat spring of substantially rectangular configuration having a central planar portion 53 with off-set resilient wings 54 and 55 integrally and obliquely diverging from the edges thereof. The stud 32 extends through an aperture 56 in the spring clamp E1 and threadedly engages the tapped hole 51 of the first stage B after freely passing through bore 30 of the base A. Ball pair 57 and 58 roll longitudinally in the slot 20 sandwiched between base recess 18 and the wing 54, while ball pair 59 and 60 are sandwiched against the slot 22 by wing 55. Clamp separator 61 is a rectangular thin metal sheet of rectangular configuration having notches 57a, 58a, 59a and 60a at the lateral edges thereof for maintaining the respective balls in spaced relationship. A central hole 61a encircles the stud 32 and limits the freedom of movement of the clamp separator 61.

It is thus easily seen that the spring clamp E1 will glide along the X-axis with the movement of the stage B when the anvil of the micrometer 38 pushes against the hardened notch 38a of that stage against the tension of the coil springs 29 and 31. At the same time, flexure of wings 54 and 55 will cause the clamp E1 to resiliently urge the stage B into surface to surface engagement with the base A while the springs 29 and 31 preferentially maintain the stage B in abutment with the anvil of the micrometer 38. Maximum longitudinal movement of the stage B is limited by the side wall of the bore 30 which will abut the stud 32 in the extreme displaced position thereof.

The upper surface of the stage B has a pair of spaced V-shaped races 62 and 64 rectilinearly extending therein and transversely oriented with respect to the races 40 and 42. Spaced slots 66 and 67 are grooved therebetween for holding coil springs 68 therein in a manner similar to that previously described. Pins 69 upwardly projecting from the slots 66 and 67 engage one end of the springs 68 while the other ends of these springs are looped about pin 70 downwardly depending from registering slots 72 and 74 in the second stage C. A Y-axis micrometer 73 is affixed to the right hand edge of the first stage B by split clamp bracket 71 so that the micrometer spindle will abut against notch 73a in the second stage C. Ball separators 75 and 76 having slots therein engaging upon pins 75b and 76b maintain the Y-axis slider balls 77, 78, 79 and 80 in spaced configuration. Spaced races 82 and 84 in the under surface of the Y-axis slider C register with complementary races 62 and 64 in the X-axis slider B, note again being invited to the fact that race 84 is of rectangular cross section rather than V-shaped to provide for facility in alignment without requiring excessive center to center machining tolerances. The upper surface of the second stage C has a pair of spaced V-shaped races 85 and 86 which guide spring clamp balls 87, 88, 89 and 90 longitudinally therein, clamp separator 91 retaining these balls in spaced apart position. The wings 92 and 93 of the spring clamp E2 act as upper races for the clamp balls 87, 88, 89 and 90 and slide thereover when stud 94 threadedly engages tapped hole 52 of the first stage B after the threaded end passes through aperture 94a in the spring clamp E2, through aperture 91a in the separator 91, and through bore 95 in the Y-axis slider C. The second stage C acts as a support member for the first stage B similar to the manner in which the base A acts as a support for the first stage, the bore 95 performing the function of position limiter with respect to Y-axis movement of the second stage C.

Figure 4:
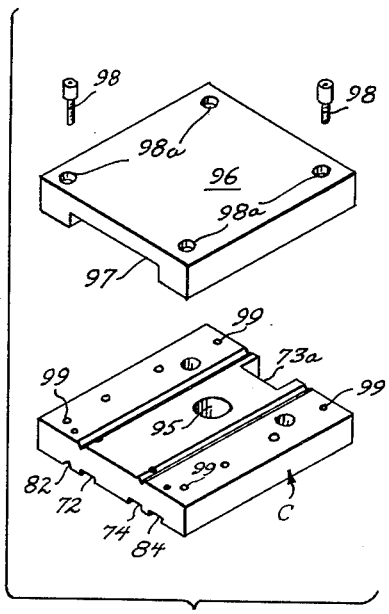
FIG. 4 is a fragmentary exploded view showing a modification of the invention adapting the manipulator for horizontal movement and positioning along the X-axis and Y-axis only.
Figure 2:
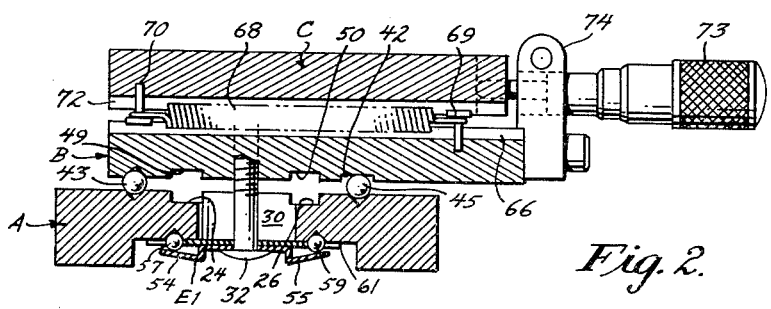
FIG. 2 is a sectional view taken along lines 2—2 of FIG. 1.

When the micro-positioner is used solely for manipulation in the X- and Y-planes, a cover plate is mounted upon the second stage C as shown in FIG. 4. The cover plate 96 is relieved at 97 on the under surface thereof to accommodate for the spring clamp E2 and screws 98 extending through counterbored holes 98a threadedly engage tapped holes 99 in the second stage C. The upper surface of the cover plate 96 supports the part to be manipulated into position, and if desired, may have mounting holes (not shown) conveniently disposed thereabout for securing the part thereto.

The Z-axis stage is incorporated upon the micro-positioner by securing angle bracket D1 to the upper surface of the second stage by mounting screws 100 extending through counterbored holes in that stage and engaging tapped holes (not shown) in the bottom surface of the bracket side members 101 and 102. Web 103 has an opening therein intermediate the side members for obtaining access to stud 104 after assembly of the spring clamp E3, the under portion of the web being relieved so as to clear the spring clamp E2. The support member D2 for the third stage slider D is mounted to the bracket D1 by screws 104 held within counterbored holes 105 in the side members 101 and 102 and threaded into tapped holes 106 in the support member.

The support member D2 is a metal plate notched at 107 to receive split bracket 108 for holding micrometer 109. The front surface of the third stage support member D2 is grooved at 110 and 112 to define races for guiding the third stage slider D along the Z-axis. Slots 114 and 115 are cut in the front surface to retain springs 116 and 117 which, when tensioned between hanger pins 118 on the support member D2 and pins (not shown) on the interior surface of the third stage D, resiliently urge the latter against the micrometer 109. V-shaped races 120 and 122 are machined in the opposite surface of the member D2 to guide the spring clamp E3 along the Z-axis over balls 123, these balls being sandwiched between the winged races 124 and 125 of the clamp E3 and the races 120 and 122 and longitudinally spaced by third stage clamp separator 126.

The third or Z-axis stage D comprises a metal plate having a rectangular notch abutting the anvil of the micrometer 109, the notch having a hardened surface 127 to resist wear. The front surface of the stage D has a plurality of tapped holes 128 formed therein so that parts or tools may be conveniently secured to the stage. A pair of rectilinear races 130 and 132 are grooved upon the inner face of the plate D so as to register with complementary races 110 and 112 on support member D2. Hardened steel balls 133 glide longitudinally in the sandwiching races 110, 130 and 132, 112 respectively, each pair of balls being axially spaced by ball separators 134. The separators 134 have spaced holes of larger diameter than the balls 133 and include a notched portion therebetween for engaging limiter pins 134b on the face of support D2 projecting from the stage guiding races 110 and 112. The stage D is coupled to its support member D2 by the spring clamping member E3, the stud 104 extending through respectively the aperture therein, the opening in the clamp separator, bore 135, and finally screwed into threaded hole 136 in the Z-axis slider D.

As is apparent from the foregoing description, the spring pre-loading, i.e. spring clamping members E1, E2, and E3, substantially eliminates the need for frequent adjustment, and possible damage to the balls by accidental shock loading is reduced to a minimum because the spring limits the load. Lateral freedom for one row of ball bearings intermediate the respective stage and its support member greatly simplifies tolerances with respect to center to center machining and also eliminates temperature effects since the rectangular race automatically compensates for such discrepancies. Each stage is resiliently urged by tensioned springs against its micrometer positioner thereby enabling smooth, accurate and quick manipulation along each of the X-, Y- and Z-axes without backlash or play, and each of the micrometers insures a steady measured movement up to the limits defined by the side wall of the respective stage bore.

Although this invention has been described in considerable detail, such description is intended as being illustrative rather than limiting, since the invention may be variously embodied and the scope of the invention is to be determined as claimed.

What is claimed is:

1. A micro-positioning manipulator comprising a base, a first stage axially reciprocable on said base in a plane parallel thereto, a second stage reciprocable on said first stage in a plane parallel thereto along an axis transverse to the reciprocation thereof, resilient means interconnecting said base and said first stage in slidable surface to surface engagement, resilient means interconnecting said first stage and said second stage in slidable surface to surface engagement whereby a point on said second stage is adapted to be oriented within a plane by selective manipulation of said first and second stages along the respective axes of reciprocation thereof, and a third stage coupled to said second stage and reciprocable along an axis intersecting the planes of manipulation of said first and second stages whereby a point on said third stage is adapted to be oriented tri-axially by selective manipulation of said first, second and third stages.

2. The invention of claim 1 wherein micrometer means affixed respectively to said base, said first stage and said second stage, and axially coupled to said first stage, said second stage and said third stage respectively, manipulatively displace said stages along the respective reciprocable axes thereof.

3. The invention of claim 2 wherein spring means associated with each of said stages respectively urge said stages resiliently into engagement with said respective micrometer means.

4. A multi-stage micro-positioner comprising a base having parallel rectilinear races in opposed horizontal surfaces thereof, a first stage having rectilinear races in the lower surface thereof registering with the races in the upper surface of said base, said first stage further having parallel rectilinear races in the upper surface thereof transversely disposed to lower surface races thereof, a second stage having parallel rectilinear races in opposed horizontal surfaces thereof, the races in the lower surface of said second stage registering with the upper surface races of said first stage, ball bearing means interposed intermediate the opposed registering races, spring clamping means interconnecting said base and said first stage in slidable surface to surface engagement about the corresponding ball bearing means, and spring clamping means interconnecting said first stage and said second stage in slidable surface to surface engagement about the corresponding ball bearing means whereby a point on said second stage is adapted to be oriented within a plane by selective manipulation of said stages.

5. The invention of claim 4 wherein each of said spring clamping means comprises a flat spring member resiliently compressing the respective stages into surface to surface engagement, and ball means slidable with said spring members and supported therewithin whereby the spring clamping means are axially reciprocable with the reciprocation of the respective stages.

6. The invention of claim 4 wherein micrometer means affixed respectively to said base and said first stage and resiliently coupled to said first stage and said second stage respectively manipulatably displaces said first and second stages along the respective reciprocable directions of movement thereof.

7. The invention of claim 4 wherein a third stage is coupled to said second stage and is reciprocable along an axis intersecting the plane of manipulation thereof whereby a point on said third stage is adapted to be oriented tri-axially by selective manipulation of said first, second and third stages.

8. The invention of claim 5 wherein said flat spring members each include a substantially flat central portion having a pair of off-set resilient wings integral therewith and obliquely diverging from opposed edges thereof, ball bearings carried within and supported by the wings against the corresponding adjacent race, and ball separators spacing and longitudinally limiting the axial movement of the ball bearings within the respective races.

9. In a micro-positioner having a stage slidably reciprocable with respect to a supporting member, registering spaced rectilinear races in opposed faces of the stage and the supporting member, ball bearing means interposed between the opposed registering races, spring clamping means slidable with the stage and urging the stage into face to face engagement with the supporting member and ball bearing means interposed between said spring clamping means and said support member whereby said stage may be manipulated with minimum friction.

10. In a micro-positioner having a stage slidably reciprocable with respect to a support member, registering spaced rectilinear races in opposed surfaces of the stage and the support member, ball bearing means interposed between the opposed registering races, spaced rectilinear races in the opposite surface of the support member parallel with the first mentioned races, a flat spring including a substantially flat central portion with a pair of resilient off-set wings integral therewith and obliquely diverging from opposed edges thereof, ball means sandwiched between the second mentioned races and the adjacent wings respectively, and a stud having a threaded end and an enlarged head, the head engaging the central portion of the flat spring and the threaded end passing through an aperture therein and freely extending through a bore in the support member to thereafter engage a complementary tapped hole in the stage whereby the stage is resiliently clamped to the support member through the plane of slidability and the spring itself is slidable with the stage.

11. The invention of claim 10 wherein said stage supports a second stage thereabove.

12. A micropositioner comprising a support member having spaced rectilinear races in opposite surfaces thereof, a reciprocably slidable stage having spaced rectilinear races registering with the races in one surface of said support member, ball bearing means interposed between the registering races, spring clamping means having flexible races complementary with the races in the other surface of said support member, and ball bearing means interposed between the complementary races and retained in said spring clamping means, said spring clamping means resiliently coupling said stage with said support member about the first mentioned ball bearing means and being slidable with said stage about the second mentioned ball bearing means.

References Cited in the file of this patent
UNITED STATES PATENTS

| | | |
|---|---|---|
| 1,874,296 | Huntsberger | Aug. 8, 1932 |
| 2,058,719 | Pigman | Oct. 27, 1936 |
| 2,308,493 | De Rentiis | Jan. 19, 1943 |
| 2,755,760 | Fermanian et al. | July 24, 1956 |